May 6, 1969     E. I. RIVIN     3,442,475
RESILIENT ANTI-VIBRATION SUPPORT

Filed Dec. 6, 1965

3,442,475
RESILIENT ANTI-VIBRATION SUPPORT
Evgeny Izrailevich Rivin, 11 Porkovaya ulitsa 44,
korpus 4, kv. 11, Moscow, U.S.S.R.
Filed Dec. 6, 1965, Ser. No. 511,687
Int. Cl. F16m 1/00; F16f 15/04
U.S. Cl. 248—24          6 Claims

ABSTRACT OF THE DISCLOSURE

A resilient anti-vibration support in which a damping element of an elastic material is disposed between a base and a cover and is attached thereto. The damping element is provided with grooves and a gap is formed between the damping element and a rim of the cover, the grooves and gap and their positions being so dimensioned and arranged that they successively close due to transverse deformation of the damping element under the action of compression load as the load increases.

---

The present invention relates to resilient anti-vibration supports employed, for example, in machines and instruments.

Known at present are resilient anti-vibration supports comprising a cover, a base and a damping element made of an elastic material, say, rubber disposed between them. The area within which the damping element is loaded with a compression load and the area of the free (unloaded) surface of said damping element are constant in the known designs of resilient anti-vibration supports and do not change in the course of loading. Therefore the rigidity of each type of resilient anti-vibration support is constant for each size thereof.

Damping of vibrations of an object, a machine, for example, necessitates mounting it on resilient anti-vibration supports so that the rigidity of each abutment be proportional to the compression load acting upon it; therefore, in order to employ resilient anti-vibration supports of known designs it is necessary to perform complicated calculations concerning the distribution of the weight of the object to be protected from vibrations between the supporting points. For mounting objects having different weight and with different weight distribution between the supporting points it is necessary to employ a variety of supports with different dimensions and composition of the material of the damping element. Even in case of correct determining of loads acting upon supporting points these loads may change due to different reasons, say, when shifting a heavy unit or changing the dimensions of a workpiece being treated on a metal-cutting machine or the like which has a deleterious effect on damping.

An object of the present invention is to provide an improved resilient anti-vibration support the rigidity of which increases in accordance with a preset dependence of the compression load as the latter increases.

Another object of the present invention is to provide a resilient anti-vibration support of the same type in which a required relation between the rigidity in the direction of the compression load and the direction perpendicular to the direction of action of the compression load could be ensured.

Still another object of the invention is to provide a resilient anti-vibration support with a equifrequent characteristic which would ensure reducing of the required variety of resilient supports and which would not require any calculations of the bearing reactions of the object being mounted.

One more object of the invention is to provide a resilient anti-vibration support abutment of the same design which would be simple and easy to manufacture.

In accordance with the above and other objects the proposed resilient anti-vibration support comprises a damping element made of an elastic material preferably of rubber and disposed between the cover and the base thereof and attached thereto; said damping element, according to the invention, having grooves made in its body, the support being provided with a gap disposed between the damping element and a bead made on the cover thereof, the width of the gap and grooves and their mutual position being chosen so that said grooves and said gap would successively close due to the transverse deformation of the damping element under the action of a compression load with an increase in this load.

It is expedient that the base of the support be made with at least one stiffening rib entering the body of the damping element.

Thus, the application of the proposed invention insures the alteration of rigidity of the resilient support in the direction of the compression load in accordance with a preset dependence of the comression load, a preset ratio between the rigidity in the direction of the compression load and the rigidity in the direction perpendicular to the action of the compression load.

Exemplary embodiments of the present invention will be described hereinafter with reference to the accompanying drawings in which.

Figure 1:
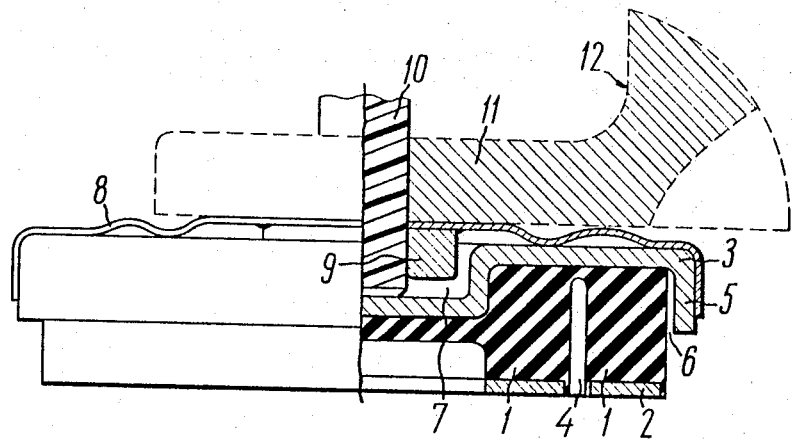
FIG. 1 shows a resilient support mounted under a supporting foot of an object, for example, a machine (side ivew with a fragmentary diametral section)

The resilient damping support shown in FIG. 1 comprises a damping element 1 made of rubber and attached to a base 2 and a cover 3. In the body of said element 1 are provided grooves 4. The cover 3 of the resilient support is made with a flange 5, between the inner surface of which and the outer surface of the damping element 1 there being a gap 6. In the middle portion of the cover 3 there is an recess 7. Attached to the surface of the cover 3 is a flat corrugated spring 8 to which by means of welding, for example, a nut 9 is fixed. An adjusting bolt 10 is screwed into said nut, said bolt passing through a hole in a supporting foot 11 of an object 12, a machine, for example, which is mounted on resilient supports. Said bolt 10 is intended to adjust the setting height of the object 12.

With an application of a compression load (say, a weight load of the machine being mounted) to the resilient support, the free side surface of the damping element 1 begins to bulge and at a certain value of the compression load the bulge of the outer side surface of the damping element 1 touches the inner side of the flange 5 of the cover 3. With a further increase in the compression load the contact area of the outer surface of the damping element 1 and the inner surface of the bead 5 increases and the area of the free surface of the damping element reduces accordingly.

As is known the rigidity of an element made of an elastic material, such as rubber, when being loaded with a compression load, depends upon the ratio between the area of the surface to which the load is applied and the free (unloaded) area of the side surface, the hardness of material, the area to which the compression load is applied and the height of the element being preset. This ratio is usually called a form factor. The greater the value of the form factor, the greater the rigidity of the element.

Thus, in reducing the free surface of the damping element 1 the rigidity of the resilient abutment increases.

With a further increase in the compression load the adjacent surfaces acquiring a convex shape touch each other in the grooves 4 and thereby the area of the free surface of the damping element 1 reduces and the rigidity of the resilient support increases still more.

Figure 2:
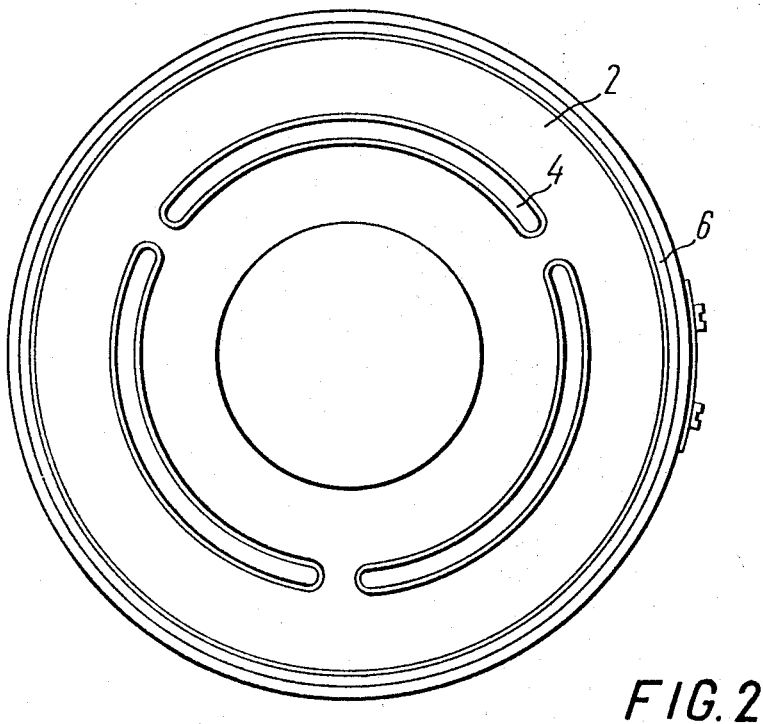
FIG. 2 is the same without the supporting foot (bottom view)

To facilitate the manufacturing technology, the grooves 4 may be made arc-shaped and, for example, as three arcs as shown in FIG. 2.

Figure 3:
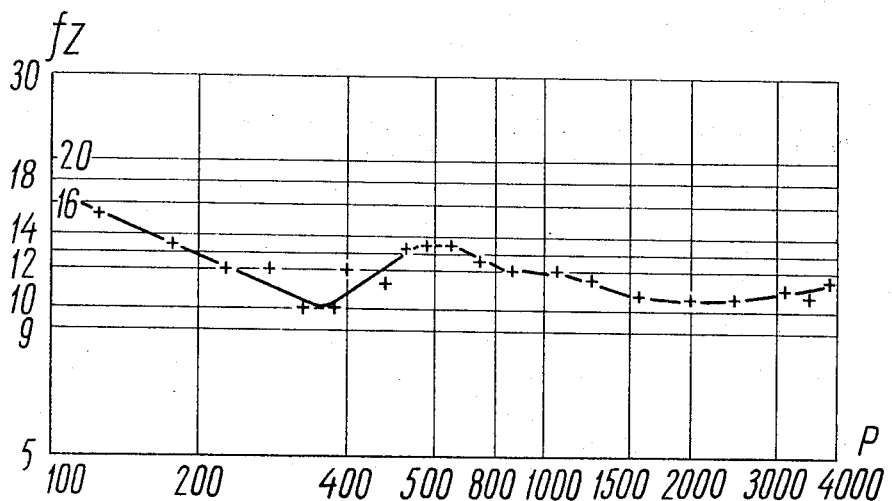
FIG. 3 is a diagram showing the relation between the fundamental frequency of an object mounted on a resilient support and the compression load.

The diagram in FIG. 3 shows the relation between the compression load and the fundamental frequency of the object mounted on resilient supports made in accordance with the drawings shown in FIGS. 1 and 2. The width of the grooves 4 and the gap 6 was chosen so as to insure the equifrequent characteristic of the resilient support.

The damping element 1 of the support, the characteristic curve of which is given in FIG. 3, is made of rubber having the Shore hardness of 42 units; the height of the damping element is 27 mm., the width of the gap 6 is 1.3 mm., and the width of the grooves 4 is 3.5 mm.

As may be seen from FIG. 3 the fundamental frequency $f_z$ of oscillations of the machine mounted on such resilient supports remains constant within ±16% with the compression load P (i.e., the mass of the mounted object) varying in the ratio of 23:1.

The adjustment of the height of the supporting foot 11 (FIG. 1) of the object 12 mounted on several resilient supports is carried out by means of screwing and unscrewing the adjusting bolt 10 whose lower end thrusts against the bottom of the recess 7 in the cover 3 of the resilient support into and out of the nut 9 kept immovable by the corrugated spring 8.

Figure 4:
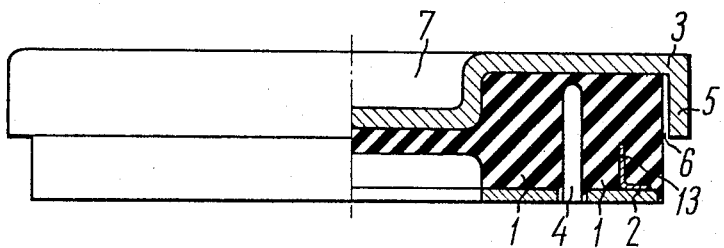
FIG. 4 shows a resilient support with a stiffening rib (side view with a fragmentary diametaral section)

The resilient support shown in FIG. 4 has a stiffening rib 13 disposed in the body of the damping element 1 and attached to the base 2 of the resilient support. Due to said stiffening rib 13 the rigidity of the resilient support increases in the direction perpendicular to the direction of action of the compression load. This is necessary when mounting, say, flat surface grinding machines, the ratio between the rigidity of the resilient support in the direction of the compression load and the rigidity in the direction perpendicular thereto at a certain height of the stiffening rib 13 being almost constant in a wide range of the compression load values.

The example, in the resilient support the characteristic curve of which is shown in FIG. 3 and the height of the stiffening rib 13 equal to 18 mm. the ratio between the rigidity of the support in the direction of the compression load and the rigidity in the direction perpendicular thereto equals 2.5–3 in the whole range of compression loads where the equifrequent characteristic of the resilient support is provided.

Figure 5:
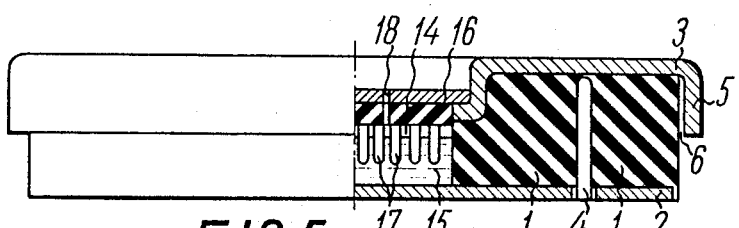
FIG. 5 shows a resilient support with a liquid-operating damper (side view with a fragmentary diametral section).

The damping element 1 of the resilient support shown in FIG. 5 has a cavity 14 filled with a viscous liquid 15, said cavity 14 being hermetically sealed with a cover 16 provided with projections 17. Said cover is also provided with a through capillary opening 18 to communicate it with the atmosphere.

When protecting an object from vibrations there take place relative oscillations of the resiliently mounted object and the floor of the premises, i.e., relative oscillations between the cover 3 and the base 2 of the resilient support. In the course of such oscillations the projections 17 made integral with the cover 16, the latter being connected with the cover 3 of the resilient support, shift relative to the viscous liquid 15 which repeats the motion of the base 2. The motion of the projections 17 relative to the liquid 15 taking place both in case of oscillations in the direction of the compression load and in case of oscillations in directions perpendicular to the direction of the compression load leads to the dissipation of the energy of oscillations, and thereby to a more rapidly acquired quiescent condition of the machine after any shocks, as well as to the reduction of the amplitudes of resonance oscillations.

It is to be understood that the embodiments of the invention shown in the drawings and described above should be considered only as exemplary.

Various modifications as to the shape, dimensions and mutual position of parts may also be resorted to. For example, the elements shown in the drawings and described above may be substituted by equivalent ones, the disposition of parts may be altered, some elements of the invention may be employed independently from the others, provided all this be effected within the spirit and scope of the invention.

What is claimed is:

1. A resilient anti-vibration support comprising a base, a cover including a rim, and a damping element of an elastic material disposed between said base and cover and attached thereto; said damping element being provided with grooves; there being provided a gap between said damping element and the rim of the cover; the said grooves and gap and their positions being so dimensioned and arranged that they successvely close due to the transverse deformation of said damping element under the action of the compression load as the load increases.

2. A resilient anti-vibration support comprising a base, a cover including a rim, a damping element of an elastic material disposed between said base and cover and attached thereto; said damping element being provided with grooves; and at least one stiffening rib extending into said damping element; there being provided a gap between said damping element and the rim of the cover; said gap and grooves and their positions being so dimensioned and arranged that they would successively close due to the transverse deformation of said damping element under the action of the compression load as the load increases.

3. A resilient anti-vibration support comprising a base, a cover including a rim, a damping element of an elastic material disposed between said base and cover and attached thereto; said damping element being provided with grooves and a cavity, viscous liquid in said cavity, a closure closing said cavity and including projections depending therefrom and inserted into said viscous liquid; there being provided a gap between said damping element and the rim of the cover, the width of said gap and grooves and their mutual position being such that they are adapted to successively close due to said damping element under the action of the compression load as the load increases.

4. A support as claimed in claim 1 wherein said damping element is deformed against said cover under compression load and said cover is of sufficiently rigid material as to receive the load from the damping element without undergoing any substantial deformation.

5. A support as claimed in claim 4 wherein the grooves in the damping element are in the form of three arcs and wherein said base is provided with corresponding grooves.

6. A support as claimed in claim 4 comprising a flat corrugated spring connected to and extending across said cover, a nut on said spring, and a bolt threadably engaged in said nut.

References Cited

UNITED STATES PATENTS

| | | | |
|---|---|---|---|
| 2,041,353 | 5/1936 | Kenney et al. | 248—22 |
| 2,241,138 | 5/1941 | Julien | 248—22 X |
| 2,602,616 | 7/1952 | Helmond | 248—24 |
| 2,642,252 | 6/1953 | Pietz | 248—24 X |
| 2,739,774 | 3/1956 | Crede | 248—24 |

ROY D. FRAZIER, *Primary Examiner.*

FRANK DOMOTOR, *Assistant Examiner.*

U.S. Cl. X.R.

248—350